(12) United States Patent
Parikh

(10) Patent No.: US 9,560,868 B2
(45) Date of Patent: Feb. 7, 2017

(54) SYSTEM AND METHOD FOR FORTIFYING FRUITS WITH VITAMINS

(71) Applicant: INVENTURE FOODS, INC., Phoenix, AZ (US)

(72) Inventor: Sandip Parikh, Phoenix, AZ (US)

(73) Assignee: INVENTURE FOODS, INC., Phoenix, AZ (US)

( * ) Notice: Subject to any disclaimer, the term of this patent is extended or adjusted under 35 U.S.C. 154(b) by 0 days.

(21) Appl. No.: 14/190,557

(22) Filed: Feb. 26, 2014

(65) Prior Publication Data

US 2015/0237896 A1    Aug. 27, 2015

(51) Int. Cl.
| | | |
|---|---|---|
| A23L 1/212 | (2006.01) | |
| B05B 12/08 | (2006.01) | |
| B05B 5/16 | (2006.01) | |
| B05C 13/02 | (2006.01) | |

(52) U.S. Cl.
CPC .............. *A23L 1/2125* (2013.01); *A23L 5/30* (2016.08); *A23L 19/05* (2016.08); *A23L 33/15* (2016.08); *A23L 33/155* (2016.08); *A23P 20/10* (2016.08); *B05B 12/08* (2013.01); *B05B 5/16* (2013.01); *B05C 13/02* (2013.01)

(58) Field of Classification Search
CPC .......... A23L 1/212; A23L 1/302; A23L 1/303; A23L 1/025; B05B 5/16; B05C 13/02
See application file for complete search history.

(56) References Cited

U.S. PATENT DOCUMENTS

| | | | |
|---|---|---|---|
| 3,713,842 A * | 1/1973 | Lubsen et al. ................ | 426/388 |
| 4,748,031 A | 5/1988 | Koppa | |
| 4,961,943 A | 10/1990 | Blanthorn et al. | |
| 5,595,775 A * | 1/1997 | Tishel ........................... | 426/241 |
| 5,765,381 A * | 6/1998 | Renz ...................... | A23L 3/361 34/576 |
| 6,207,207 B1 | 3/2001 | Belzowski et al. | |
| 6,500,474 B2 | 12/2002 | Cross et al. | |
| 8,486,469 B2 | 7/2013 | Coleman et al. | |
| 8,486,470 B2 | 7/2013 | Laukli et al. | |
| 2007/0082094 A1* | 4/2007 | McClements et al. ....... | 426/302 |
| 2008/0317907 A1* | 12/2008 | Thomas et al. ................. | 426/93 |

(Continued)

FOREIGN PATENT DOCUMENTS

| | | |
|---|---|---|
| WO | WO2012136854 | 10/2012 |
| WO | WO2012151201 | 11/2012 |

OTHER PUBLICATIONS

Electrostatic Coating of Foods Source: http://www.wageningenur.nl/en/show/Electrostatic-coating-of-foods.htm.

(Continued)

*Primary Examiner* — Erik Kashnikow
*Assistant Examiner* — Preston Smith
(74) *Attorney, Agent, or Firm* — Weiss & Moy, P.C.; Jeffrey D. Moy

(57) ABSTRACT

A system and method for fortifying fruits with a nutrient solution containing vitamins in order to meet the daily required nutrient values for those vitamins. Ideally, one serving of fortified fruits will have the amount of nutrients that would be present in 2-4 servings of unfortified fruits. In a preferred embodiment, the fruits will be frozen and positively charged and the nutrient solution will be negatively charged in order to ensure that the nutrient solution will adhere to the fruits.

7 Claims, 1 Drawing Sheet

(56) References Cited

U.S. PATENT DOCUMENTS

2009/0220654 A1    9/2009  Kino et al.
2011/0287147 A1    11/2011 Pannell et al.

OTHER PUBLICATIONS

Coating Nutravit Technology Source: http://www.nutravit-technology.com/coating/.
The Crunch on Batters and Breadings Source: http://www.preparedfoods.com/articles/111863-the-crunch-on-batters-and-breadings.
What is NutriFusion NutriFusion Source: http://www.nutrifusion.com/What_is_NutriFusion.html, Date: Feb. 5, 2014.
Author: Jareer M. Abu-Ali, M.S. The Ohio State University Food Coating Applications in: Electrostatic Atomization, Nonelectrostatic Coating and Electrostatic Powder Coating.

\* cited by examiner

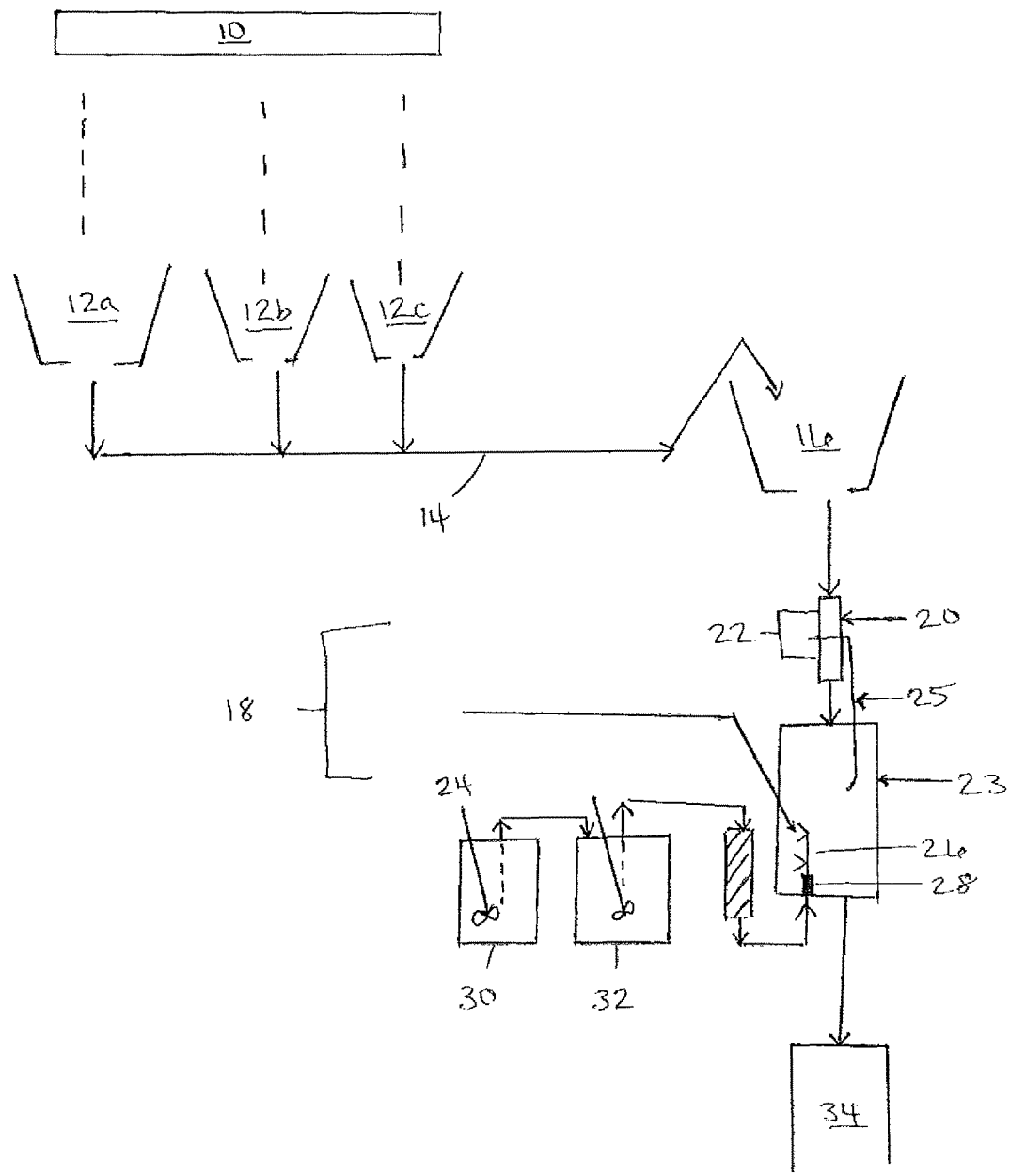

US 9,560,868 B2

SYSTEM AND METHOD FOR FORTIFYING FRUITS WITH VITAMINS

TECHNICAL FIELD

This disclosure generally relates to food products and, more particularly, to a system and method for fortifying fruits with vitamins.

BACKGROUND OF THE INVENTION

The Reference Daily Intake or Recommended Daily Intake (RDI) is the daily intake level of a nutrient that is considered to be sufficient to meet the requirements of healthy individuals. The RDI is used to determine the Daily Value (DV) of foods. The DVs are typically printed on nutrition facts labels in the United States, which is required and regulated by the Food and Drug Administration (FDA).

Different foods contain different nutrients. No single food is capable of supplying all of the nutrients in the amounts that an individual would need to stay healthy. It is therefore important to eat a variety of foods to ensure that the body is receiving all of the nutrients that it needs. The five major food groups are: Grains, Vegetables, Fruit, Dairy, and Meat. The general recommended daily requirement of fruit servings is between two to four servings per day, wherein one serving of fruit is typically about 140 g of fruits. Two to four servings of fruits would equal between 280 g-560 g of fruits. This is a large amount of fruits to consume on a daily basis, which is why most individuals fail to do so.

Therefore a need exists to provide a system and method to overcome the above problem.

SUMMARY OF THE INVENTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one embodiment of the present invention, a system for fortifying fruits with vitamins is disclosed. The system comprises: a nutrient mixing kettle for mixing a nutrient solution; a blending tumbler for coating fruits with the nutrient solution; and an electrostatic coating assembly for positively charging the fruits before they are sprayed with the nutrient solution and for negatively charging the nutrient solution before it is sprayed onto the fruits.

In accordance with another embodiment of the present invention, a method for fortifying fruits with vitamins is disclosed. The method comprises the steps of providing a nutrient solution that contains at least one vitamin; negatively charging the nutrient solution; freezing a predetermined amount of fruits; positively charging the fruits; and spraying positively charged fruits with negatively charged nutrient solution.

In accordance with another embodiment of the present invention, a method for fortifying fruits with vitamins is disclosed. The method comprises the steps of: providing a fruit fortifying system comprising: a nutrient mixing kettle for mixing a nutrient solution; a blending tumbler for coating fruits with the nutrient solution; and an electrostatic coating assembly having a positive electrode coupled to the blending tumbler for positively charging the fruits before they are sprayed with the nutrient solution and having a negative electrode coupled to the nutrient mixing kettle for negatively charging the nutrient solution before it is sprayed onto the fruits; providing a nutrient powder that comprises Vitamin A, Vitamin B1, Vitamin B6, Vitamin C, Vitamin D, Vitamin E, and Vitamin K; dissolving the nutrient powder in a predetermined amount of water in order to create the nutrient solution; individually quick freezing a predetermined amount of at least one type of fruit; positively charging the fruits as they pass through the blending tumbler; negatively charging the nutrient solution while it is mixed within the nutrient mixing kettle; and spraying the fruits that have been positively charged with the nutrient solution that has been negatively charged.

BRIEF DESCRIPTION OF THE DRAWINGS

The novel features believed to be characteristic of the application are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The application itself, however, as well as a preferred mode of use, further objectives, and advantages thereof, will be best understood by reference to the following detailed description of illustrative embodiments when read in conjunction with the accompanying drawings, wherein:

FIG. 1 is a flow diagram of a system and method for fortifying fruits with vitamins.

DETAILED DESCRIPTION OF THE DISCLOSURE

The description set forth below is intended as a description of presently preferred embodiments of the disclosure and is not intended to represent the only forms in which the present disclosure can be constructed and/or utilized. The description sets forth the functions and the sequence of steps for constructing and operating the disclosure. It is to be understood, however, that the same or equivalent functions and sequences can be accomplished by different embodiments that are also intended to be encompassed within the spirit and scope of this disclosure.

Referring to FIG. 1, a system and method for fortifying fruits with vitamins, in accordance with one embodiment of the present invention, is shown. In this embodiment, the system and method for fortifying fruits may be used specifically to fortify fruits with all of the major essential vitamins that are required to maintain one's health. It should be clearly understood, however, that although fruits are being used in the examples described herein, the method for fortifying foods may be used with any food and is not limited to fortifying fruits. And while certain fruits are used as examples herein (i.e. strawberries, blueberries, and cherries), it should also be clearly understood that any type of fruit may be fortified. In its simplest form, the system may comprise: an individual quick freeze tunnel (IQF) 10, an electrostatic coating system 18, a nutrient mixing kettle 30, and a blending tumbler 23. At a minimum, the method comprises the steps of: providing a nutrient solution which contains all of the major essential vitamins that are found in fruits, freezing fruits, and then spraying the nutrient solution onto the frozen fruits in order to increase the amount of vitamins and nutrients contained therein.

The first step of the method for fortifying fruits is to create a nutrient solution 26. A nutrient powder, like the nutrient powder produced by NutriFusion™, may be used to create the nutrient solution 26. The nutrient powder may contain predetermined amounts of each of the major essential vitamins that a person requires to stay healthy (e.g. Vitamin A, Vitamin B1, Vitamin B6, Vitamin C, Vitamin D, Vitamin E, and Vitamin K). It should be clearly understood, however, that substantial benefit may be derived from a nutrient solution 26 that may contain only one of the above listed vitamins or that may contain some or all of the above listed vitamins in any desired combination. The predetermined amounts of each of the vitamins will depend upon the daily nutritional values (% DV) that are desired for each vitamin in the resulting fortified food (see Examples 1-4 below). For example, the amount of Vitamin A that is provided in the nutrient powder may be an amount sufficient to provide fortified strawberries with 125% DV of Vitamin A per serving (140 g serving).

In order to create the nutrient solution 26, a predetermined amount of nutrient powder may be dissolved in water. The water may be at a temperature between 34° F. and 44° F., with a preferred temperature of 40° F. If the water temperature is lower than 34° F., then the nutrient solution 26 may freeze and it cannot be sprayed onto the fruit. If the water temperature is higher than 44° F., then the nutrient solution 26 will melt the fruit (which may be individually quick frozen) and will not properly adhere to the fruit and therefore will not provide the required nutrients for the fruit. The nutrient solution 26 may be mixed in a nutrient mixing kettle 30 with a high speed mixer/blender in order to ensure that the nutrient solution 26 is thoroughly blended and to ensure that the nutrient powder remains in suspension. The nutrient solution 26 may be constantly mixed/agitated to ensure that it is in suspension at all times during application onto the fruits.

Depending upon the type of fruit being fortified, the strength of the solution and the amount of nutrient solution 26 sprayed on the fruits may vary to ensure that the nutrient solution 26 properly adheres to the fruit. For example, for smaller fruits like blueberries, the concentration of the nutrient solution 26 may be between 0.25%-0.50% (wherein the amount of nutrient powder comprises between 0.25%-0.50% of the nutrient solution 26). Where the nutrient solution 26 is prepared in batches of 100 gallons, 5%-10% of the batch of nutrient solution 26 may be sprayed on the smaller fruits. As a further example, for larger fruits like strawberries, the concentration of the nutrient solution 26 may be between 1.0%-2.0% (wherein the nutrient powder comprises between 1.0%-2.0% of the nutrient solution 26). Where the nutrient solution 26, is prepared in batches of 100 gallons, 1.25%-2.5% of the batch of nutrient solution 26 may be sprayed on the larger fruits. It should be clearly understood that the nutrient solution 26 may be made in different sized batches and the percentage of each batch to be sprayed upon the fruits can be modified accordingly. For example, according to one embodiment, a ratio of nutrient solution 26 to fruit could be 5 g nutrient solution 26 per 95 g of fruit. But it should be clearly understood that substantial benefit may be derived from the use of an alternative ratio as long as the fruits (with the nutrient solution 26) meet the daily required nutrient values. Ideally, the level of the amount of nutrient solution 26 sprayed may be adjusted so that amount of nutrients provided by a recommended daily 2-4 servings of unfortified fruits (i.e. fruits that have not been fortified with nutrient solution 26) may be obtained by consuming only a single serving (i.e. 140 g) of fortified fruits.

Prior to being fortified with the nutrient solution 26, the fruits may be frozen. In one embodiment, fruit may be individually quick frozen (IQF) with IQF Freezing tunnels 10 such as, but not limited to, the IQF Freezing tunnels 10 made by SRIGOSGANDIA or OPTOFAST. It should be clearly understood, however, that substantial benefit may be still be derived from the fruits being frozen by alternative means. Having the fruit individually quick frozen may help to prevent the frozen fruits from clumping together so that they can be individually sprayed with the nutrient solution 26. After the fruits are individually quick frozen, the IQF fruits may be placed into a fruit hopper 12. In one embodiment, one type of fruit may be fortified with vitamins or several types of fruits may be fortified with vitamins. Where several types of fruits are fortified with vitamins, the different fruit varieties may be stored together in a single fruit hopper 12 or each type of fruit may have its own hopper 12 (e.g. a strawberry hopper 12a, a blueberry hopper 12b, and a cherry hopper 12c, each generically referred to as fruit hopper 12).

In one embodiment, for example where multiple fruits are being used to create a mixed berry batch, individually quick frozen fruits may pass from their respective fruit hoppers 12 onto a vibratory conveyor 14 which carries the fruits to a blended fruit hopper 16. As the fruits drop from their respective fruit hoppers 12 onto the vibratory conveyor 14, the vibratory conveyor 14 moves at a speed that is sufficient to mix the fruits at a rate of between 80-90 lbs of fruit per minute. The rate and speed of vibration of the vibratory conveyor 14 will control the ratio of fruit being blended together. For example, if only a small number of blueberries end up being mixed with a larger amount of strawberries and cherries, the rate and speed of vibration of the vibratory conveyor 14 may be adjusted until a more preferable amount of blueberries are being mixed with the strawberries and cherries. It should be understood that any suitable speed of vibration may be used as long as a satisfactory mix of the different berries is achieved. If only one type of fruit is being used, then just the one type of fruit would be conveyed to the blended fruit hopper 16. Alternatively, if only one type of fruit is being used to create a batch, a blended fruit hopper 16 may not be used.

After passing through the blended fruit hopper 16, the fruits may then pass through to a blending tumbler 23 so that the fruits may be coated with the nutrient solution 26. The fruit may enter a first end of the blending tumbler 23 and the fruits may be sprayed from an opposite second end of the blending tumbler 23 with the nutrient solution 26 by a sprayer 28. Alternatively, the sprayer 28 may be coupled to any other suitable portion of the blending tumbler 23. The blending tumbler 23 may be an elongated rotating drum with flights or fins that pick up the fruits as the blending tumbler 23 rotates and drops the fruits through the nutrient solution 26 spray stream. In order to ensure that all of the fruits receive an even coating of the nutrient solution 26 within the blending tumbler 23, the blending tumbler 23 may be tilted at an angle of between 15°-35°, with an ideal angle being at approximately 20°. To further ensure that all of the fruits receive an even coating of the nutrient solution 26 within the blending tumbler 23, the blending tumbler 23 may be rotating at a speed between 25 RPM and 95 RPM wherein a preferred speed may be approximately 35 RPM. It should be clearly understood, however, that the angle of the blending tumbler 23 and the speed at which it rotates may be varied as needed in order to accomplish an even coating of all of the fruits with the nutrient solution 26 within the blending tumbler 23.

In one embodiment, an electrostatic coating system 18 may be used to positively charge the fruits and to negatively charge the nutrient solution 26. The negatively charged nutrient solution 26 may therefore be attracted to the positively charged fruits which will help the nutrient solution 26 to effectively adhere the fruits. The electrostatic coating system 18 may comprise a main panel 22 which controls: a) the feed and weight of the fruit that will enter into the blending tumbler 23; b) the amount of nutrient solution sprayed onto the fruits; c) the positive charge applied to the fruits; and d) the negative charge applied to the nutrient solution 26. The fruits may be positively charged prior to being sprayed with the negatively charged nutrient solution 26. In order to accomplish this, a positive electrode 25 (cathode) may be coupled to the blending tumbler 23, which positively charges the fruits while they are in the blending tumbler 23. The positive electrode 25 may be coupled to the first end of the blending tumbler 23 or to any other suitable portion of the blending tumbler 23. A weigh scale 20 may also be coupled to the first end of the blending tumbler 23. Alternatively, the weigh scale 20 may be coupled to any other suitable portion of the blending tumbler 23. The weigh scale 23 helps control the amount of nutrient solution 26 that is sprayed onto the fruits. The weigh scale 26 may be set or automatically calibrated to allow a certain amount of fruit to pass through the blending tumbler 23 in order to ensure that the fruits are being coated with enough nutrient solution 26 so that one serving (approximately 140 g total weight) of the fortified fruits contains the desired amount of nutrients. For example, the weigh scale may be set according to the amount of fruit through-put that would be required to have a continuous bagging process; e.g. for continuously packing small 8 oz. bags, one may set the scale to deliver 2,500 lbs of fruit/hour.

The nutrient solution 26 may be negatively charged prior to being sprayed onto the positively charged fruits. In order to accomplish this, a negative electrode 24 (anode) may be coupled to the nutrient mixing kettle 30, which negatively charges the nutrient solution 26 while it is being mixed within the nutrient mixing kettle 30. The negatively charged nutrient solution 26 may then pass from the nutrient mixing kettle 30 to a nutrient application kettle 32 which is further coupled to the sprayer 28 that may be positioned at the second end of the blending tumbler 23. The negatively charged nutrient solution 26 may then be sprayed by the sprayer 28 onto the positively charged fruits within the blending tumbler 23. The fine sprayed nutrient solution 26 immediately freezes on contact with the individually quick frozen fruits. The fortified fruit then may be immediately sent to a packaging system 34 so that they may be packaged for distribution and preferably stored in a freezer at temperatures below 5° F.

Below are several examples of fruits that may be used and their daily nutritional values before and after being fortified with the nutrient solution 26.

Example 1

Strawberries

| | REGULAR STRAWBERRIES AMT/SERVING | % DV | FORTIFIED AMT/SERVING | % DV |
|---|---|---|---|---|
| VITAMIN A(IU) | 100 | 2 | 6232 | 125 |
| VITAMIN B1(mg) | 0 | 0 | 2.175 | 145 |
| VITAMIN B6(mg) | 0 | 0 | 2.9 | 145 |
| VITAMIN C(mg) | 60 | 100 | 150 | 250 |
| VITAMIN D(IU) | 0 | 0 | 700 | 175 |
| VITAMIN E(IU) | 0 | 0 | 31.6 | 105 |
| VITAMIN K (mg) | 0 | 0 | 0.04 | 50 |

In Example 1, a single serving (140 g total weight) of strawberries contain about 100 IU of Vitamin A; 60 mg of Vitamin C, and no Vitamin B1, B6, D, E, or K. (IU stands for International Units wherein IU is a quantity of a biologic/vitamin that produces a particular biological effect agreed upon as an international standard.) Prior to fortifying the strawberries, they contained 100% of the recommended Daily Value (% DV) of Vitamin C, contained only 2% DV of Vitamin A, and contained none of the other indicated Vitamins, After spraying the individually quick frozen strawberries with nutrient solution 26, the fortified strawberries contained 6,232 IU Vitamin A, 2.175 mg Vitamin B1, 2.9 mg Vitamin B6, 150 mg Vitamin C, 700 IU Vitamin D, 31.6 IU Vitamin E, and 0.04 mg Vitamin K. By fortifying the strawberries with the nutrient solution 26, the fortified strawberries contained 125% DV of Vitamin A, 145% DV of Vitamin B1, 145% DV of Vitamin 136, 250% DV of Vitamin C, 175% DV of Vitamin D, 105% DV of Vitamin E, and 50% DV of Vitamin K.

Example 2

Blueberries

| | REGULAR BLUEBERRIES AMT/SERVING | % DV | FORTIFIED AMT/SERVING | % DV |
|---|---|---|---|---|
| VITAMIN A(IU) | 100 | 2 | 6232 | 125 |
| VITAMIN B1(mg) | 0 | 0 | 2.175 | 145 |
| VITAMIN B6(mg) | 0 | 0 | 2.9 | 145 |
| VITAMIN C(mg) | 3.6 | 6 | 150 | 250 |
| VITAMIN D(IU) | 0 | 0 | 700 | 175 |
| VITAMIN E(IU) | 0 | 0 | 31.6 | 105 |
| VITAMIN K (mg) | 0 | 0 | 0.04 | 50 |

In Example 2, a single serving (140 g total weight) of blueberries contain about 100 IU of Vitamin A; 3.6 mg of Vitamin C, and no Vitamin B1, B6, D, E, or K. Prior to fortifying the blueberries, they contained 6% of the recommended Daily Value (% DV) of Vitamin C, contained 2% DV of Vitamin A, and contained none of the other indicated Vitamins. After spraying the individually quick frozen blueberries with nutrient solution 26, the fortified blueberries contained 6,232 IU Vitamin A, 2.175 mg Vitamin B1, 2.9 mg Vitamin B6, 150 mg Vitamin C, 700 IU Vitamin D, 31.6 IU Vitamin E, and 0.04 mg Vitamin K. By fortifying the blueberries with the nutrient solution 26, the fortified blueberries contained 125% DV of Vitamin A, 145% DV of Vitamin B1, 145% DV of Vitamin B6, 250% DV of Vitamin C, 175% DV of Vitamin D, 105% DV of Vitamin E, and 50% DV of Vitamin K.

Example 3

Cherries

|  | REGULAR CHERRY BLEND AMT/SERVING | % DV | FORTIFIED AMT/SERVING | % DV |
|---|---|---|---|---|
| VITAMIN A(IU) | 165 | 3 | 6232 | 125 |
| VITAMIN B1(mg) | 0 | 0 | 2.175 | 145 |
| VITAMIN B6(mg) | 0 | 0 | 2.9 | 145 |
| VITAMIN C(mg) | 22 | 33 | 150 | 250 |
| VITAMIN D(IU) | 0 | 0 | 700 | 175 |
| VITAMIN E(IU) | 0 | 0 | 31.6 | 105 |
| VITAMIN K (mg) | 0 | 0 | 0.04 | 50 |

In Example 3, a single serving (140 g total weight) of cherries contain about 165 IU of Vitamin A; 22 mg of Vitamin C, and no Vitamin B1, B6, D, E, or K. Prior to fortifying the cherries, they contained 33% of the recommended Daily Value (% DV) of Vitamin C, contained 3% DV of Vitamin A, and contained none of the other indicated Vitamins, After spraying the individually quick frozen cherries with nutrient solution 26, the fortified cherries contained 6,232 IU Vitamin A, 2.175 mg Vitamin B1, 2.9 mg Vitamin B6, 150 mg Vitamin C, 700 IU Vitamin D, 31.6 IU Vitamin E, and 0.04 mg Vitamin K. By fortifying the cherries with the nutrient solution 26, the fortified cherries contained 125% DV of Vitamin A, 145% DV of Vitamin B1, 145% DV of Vitamin B6, 250% DV of Vitamin C, 175% DV of Vitamin D, 105% DV of Vitamin E, and 50% DV of Vitamin K.

Example 4

Mixed Berries (Strawberries, Blueberries, and Cherries)

|  | REGULAR MIXED BERRY BLEND AMT/SERVING | % DV | FORTIFIED AMT/SERVING | % DV |
|---|---|---|---|---|
| VITAMIN A(IU) | 165 | 3 | 6232 | 125 |
| VITAMIN B1(mg) | 0 | 0 | 2.175 | 145 |
| VITAMIN B6(mg) | 0 | 0 | 2.9 | 145 |
| VITAMIN C(mg) | 21 | 32 | 150 | 250 |
| VITAMIN D(IU) | 0 | 0 | 700 | 175 |
| VITAMIN E(IU) | 0 | 0 | 31.6 | 105 |
| VITAMIN K (mg) | 0 | 0 | 0.04 | 50 |

In Example 4, a single serving (140 g total weight) of mixed berries (strawberries, blueberries, and cherries) contain about 165 IU of Vitamin A; 21 mg of Vitamin C, and no Vitamin B1, B6, D, E, or K. Prior to fortifying the mixed berries, they contained 32% of the recommended Daily Value (% DV) of Vitamin C, contained 3% DV of Vitamin A, and contained none of the other indicated Vitamins. After spraying the individually quick frozen mixed berries with nutrient solution 26, the mixed berries contained 6,232 IU Vitamin A, 2.175 mg Vitamin B1, 2.9 mg Vitamin B6, 150 mg Vitamin C, 700 IU Vitamin D, 31.6 IU Vitamin E, and 0.04 mg Vitamin K. By fortifying the mixed berries with the nutrient solution 26, the fortified mixed berries contained 125% DV of Vitamin A, 145% DV of Vitamin B1, 145% DV of Vitamin B6, 250% DV of Vitamin C, 175% DV of Vitamin D, 105% DV of Vitamin E, and 50% DV of Vitamin K.

Example 5

Mixed Berries (Strawberries and Blueberries)

|  | REGULAR STRAWBERRY/ BLUEBERRY AMT/SERVING | % DV | FORTIFIED AMT/SERVING | % DV |
|---|---|---|---|---|
| VITAMIN A(IU) | 100 | 2 | 6232 | 125 |
| VITAMIN B1(mg) | 0 | 0 | 2.175 | 145 |
| VITAMIN B6(mg) | 0 | 0 | 2.9 | 145 |
| VITAMIN C(mg) | 40 | 65 | 150 | 250 |
| VITAMIN D(IU) | 0 | 0 | 700 | 175 |
| VITAMIN E(IU) | 0 | 0 | 31.6 | 105 |
| VITAMIN K (mg) | 0 | 0 | 0.04 | 50 |

In Example 5, a single serving (140 g total weight) of mixed berries (strawberries and blueberries) contain about 100 IU of Vitamin A; 40 mg of Vitamin C, and no Vitamin B1, B6, D, E, or K. Prior to fortifying the mixed berries, they contained 32% of the recommended Daily Value (% DV) of Vitamin C, contained 3% DV of Vitamin A, and contained none of the other indicated Vitamins. After spraying the individually quick frozen mixed berries with nutrient solution 26, the fortified mixed berries contained 6,232 IU Vitamin A, 2.175 mg Vitamin B1, 2.9 mg Vitamin B6, 150 mg Vitamin C, 700 IU Vitamin D, 31.6 IU Vitamin E, and 0.04 mg Vitamin K. By fortifying the mixed berries with the nutrient solution 26, the fortified mixed berries contained 125% DV of Vitamin A, 145% DV of Vitamin B1, 145% DV of Vitamin B6, 250% DV of Vitamin C, 175% DV of Vitamin D, 105% DV of Vitamin E, and 50% DV of Vitamin K.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those or ordinary skill in the relevant art are expressly incorporated herein by reference and intended to be encompassed by the claims. Moreover, nothing disclosed herein is intended to be dedicated to the public.

What is claimed is:

1. A method for fortifying fruits with vitamins comprising the steps of:
   providing a fruit fortifying system comprising:
      a nutrient mixing kettle for mixing a nutrient solution;
      a blending tumbler for coating fruits with the nutrient solution; and
      an electrostatic coating assembly having a positive electrode coupled to the blending tumbler for positively charging the fruits before they are sprayed with the nutrient solution and having a negative electrode coupled to the nutrient mixing kettle for negatively charging the nutrient solution before it is sprayed onto the fruits;
   providing a nutrient powder that comprises Vitamin A, Vitamin B1, Vitamin B6, Vitamin C, Vitamin D, Vitamin E, and Vitamin K;
   dissolving the nutrient powder in a predetermined amount of water in order to create the nutrient solution;
   individually freezing a predetermined amount of at least one type of fruit;
   positively charging the fruits as they pass through the blending tumbler;
   negatively charging the nutrient solution while it is mixed within the nutrient mixing kettle; and
   spraying the fruits that have been positively charged with the nutrient solution that has been negatively charged.

2. The method of claim 1 wherein a concentration of the nutrient solution is between 0.25%40.50% when fortifying fruits smaller than a predetermined size.

3. The method of claim 1 wherein a concentration of the nutrient solution is between 1.0%-2.0% when fortifying fruits larger than a predetermined size.

4. The method of claim 1 further comprising the step of constantly mixing the nutrient solution with a mixer within the nutrient mixing kettle to ensure that the nutrient powder is kept in suspension within the water.

5. The method of claim 1 further comprising the step of maintaining the nutrient solution at a temperature of between 34° F. and 40° F.

6. The method of claim 1 wherein the blending tumbler is tilted at an angle between 15°-35° and rotated at a speed between 25 RPM and 95 RPM.

7. The method of claim 6 wherein the blending tumbler is tilted at an angle of 20° and wherein the blending tumbler is rotated at a speed of 35 RPM to ensure an even coating of all of the fruits with the nutrient spray.

* * * * *